(12) United States Patent
Sakuma

(10) Patent No.: US 7,052,660 B2
(45) Date of Patent: May 30, 2006

(54) WET-PROCESSING METHOD FOR COMBUSTION ASHES OF PETROLEUM FUELS

(75) Inventor: Akira Sakuma, Ibaraki-ken (JP)

(73) Assignee: Kashima-Kita, Electric Power Corporation, Ibaraki-ken (JP)

( * ) Notice: Subject to any disclaimer, the term of this patent is extended or adjusted under 35 U.S.C. 154(b) by 675 days.

(21) Appl. No.: 10/169,143

(22) PCT Filed: Feb. 27, 2002

(86) PCT No.: PCT/JP02/01794

§ 371 (c)(1),
(2), (4) Date: Sep. 18, 2002

(87) PCT Pub. No.: WO03/072275

PCT Pub. Date: Sep. 4, 2003

(65) Prior Publication Data

US 2003/0161770 A1    Aug. 28, 2003

(51) Int. Cl.
*C01G 31/00*    (2006.01)
*C01C 1/00*    (2006.01)

(52) U.S. Cl. .......................... 423/67; 423/68; 423/356
(58) Field of Classification Search .................. 423/67, 423/68, 356
See application file for complete search history.

(56) References Cited

U.S. PATENT DOCUMENTS 3,300,276 A * 1/1967 Bretschneider et al. ....... 423/67
4,668,250 A * 5/1987 Drese ........................... 95/263
6,033,637 A * 3/2000 Akahoshi et al. ............ 423/155

FOREIGN PATENT DOCUMENTS

| EP | 852220 | * | 8/1998 |
| JP | 61-171583 | * | 8/1986 |
| JP | 62-298489 | * | 12/1987 |

* cited by examiner

*Primary Examiner*—Steven Bos
(74) *Attorney, Agent, or Firm*—Nixon & Vanderhye P.C.

(57) ABSTRACT

There is disclosed a wet-processing method for combustion ashes of petroleum fuels, comprising a slurry preparation step of preparing a slurry of the combustion ashes; a metal oxidation step of preparing a slurry containing ammonium metavanadate; a solid/liquid separation step of removing solids from the slurry containing ammonium metavanadate; a double decomposition step for ammonium sulfate, of adding a magnesium compound to an aqueous ammonium sulfate solution recovered from the solid/liquid separation step; and an ammonia recovery step of recovering ammonia from a reaction solution recovered from the double decomposition step. The above metal oxidation step is conducted while controlling an ammonium sulfate concentration of the aqueous solution to 20 to 45% by weight and the temperature of the aqueous solution to not more than 50° C., and the above solid/liquid separation step is conducted using a specific solid/liquid separator while controlling the temperature of the slurry to not more than 40° C. The above wet-processing method is an industrially useful and simple process capable of readily recovering vanadium from combustion ashes which is suitably used, in particular, in such a case where the amount of combustion ashes to be treated is relatively small or where the combustion ashes have a less carbon content and a high vanadium content.

10 Claims, 2 Drawing Sheets

WET-PROCESSING METHOD FOR COMBUSTION ASHES OF PETROLEUM FUELS

TECHNICAL FIELD

The present invention relates to a wet-processing method for combustion ashes of petroleum fuels, and more particularly, to a wet-processing method for combustion ashes of petroleum fuels, which are collected by a dust collector disposed in an exhaust gas passage of a boiler or the like using petroleum fuels, and contain at least vanadium, which is an industrially useful and simple process capable of readily recovering vanadium from combustion ashes of petroleum fuels which is suitably used in such a case where the amount of combustion ashes to be treated is relatively small or where the combustion ashes have a less carbon content and a high vanadium content.

BACKGROUND ARTS

In various kinds of combustion furnaces (combustion devices) using petroleum fuels such as heavy oils, "ORIMULSION", etc., for example, boilers of thermal power plants and garbage incinerators, ammonia is added into combustion gases for preventing corrosion of the combustion furnaces by sulfate gases ($SO_3$) contained in the combustion gases. In some cases, magnesium oxide may also be used instead of ammonia.

Meanwhile, "ORIMULSION" is a registered trademark owned by BITOR CO., LTD., Venezuela, for emulsion fuels prepared by dispersing natural asphalt produced at the basin of Orinoco River (Venezuela, South America) in water using a surfactant.

Accordingly, the combustion ashes collected and recovered by an electrostatic precipitator disposed at the downstream of a fire flue, contain ammonium sulfate or the like in addition to ashes composed mainly of unburned carbon and heavy metals (Ni, V, Mg, etc.). In particular, the ORIMULSION's combustion ashes have a less carbon content and high contents of ammonium sulfate (or magnesium sulfate) and vanadium. For example, the following components as shown in Table 1 below (based on dry solids) are contained in the combustion ashes recovered from a boiler using "ORIMULSION".

TABLE 1

| Components | C | $NH_4$ | $SO_4$ | V | Ni | Mg |
|---|---|---|---|---|---|---|
| wt. % | 1 to 5 | 12 to 20 | 50 to 65 | 4 to 9 | 0.5 to 2 | 0.1 to 2 |

As a wet-processing method of the combustion ashes, there have been proposed many techniques called a "wet-process" which are capable of not only recovering valuable components such as vanadium, but also taking suitable countermeasures against public pollution using a closed system. More specifically, there are known such wet-processes, for example, as described in Japanese Patent Application Laid-Open (KOKAI) Nos. 60-19086(1985) and 60-46930(1985) and Japanese Patent Publication (KOKOKU) Nos. 4-61709(1992) and 5-13718(1993) as already filed by the present applicant.

For example, the wet-process for combustion ashes of petroleum fuels as described in Japanese Patent Publication (KOKAI) No. 5-13718(1993) comprises (i) a first step of mixing combustion ashes with water by optionally adding thereto sulfuric acid for controlling the pH value to not more than 3, thereby preparing a slurry of the combustion ashes; (ii) a second step of separating solids (unburned carbon, etc.) from the slurry; (iii) a third step of heating the remaining liquid portion to a temperature of not less than 70° C. and oxidizing metals while feeding ammonia and an oxidant thereto for adjusting the pH value to 7 to 9; (iv) a fourth step of separating precipitated solids (iron sludge); (v) a fifth step of cooling the obtained liquid portion to a temperature of not more than 40° C., thereby precipitating vanadium compounds (ammonium metavanadate); (vi) a sixth step of separating the precipitated vanadium compounds; (vii) a seventh a step of adding calcium hydroxide or calcium oxide to the obtained liquid portion to precipitate gypsum and hydroxides of metals (nickel and magnesium), and liberating free ammonia simultaneously; (viii) an eighth step of stripping and recovering ammonia from the free ammonia; and (ix) a ninth step of separating the obtained gypsum.

However, the above-described large-scale processes are uneconomical and disadvantageous in such a case where the amount of combustion ashes to be treated is relatively small or where the combustion ashes have a less carbon content and a high vanadium content.

The present invention has been achieved in view of the above problems. An object of the present invention is to provide an industrially useful and simple process capable of readily recovering vanadium from combustion ashes which is suitably used in such a case where the amount of combustion ashes to be treated is relatively small or where the combustion ashes have a less carbon content and a high vanadium content.

BRIEF DESCRIPTION OF THE DRAWINGS

FIG. 1 and FIG. 2 are explanatory views showing a preferred embodiment of the wet-processing method for combustion ashes of petroleum fuels according to the present invention, wherein FIG. 1 shows a front-stage process, and FIG. 2 shows a rear-stage process.

DISCLOSURE OF THE INVENTION

Figure 1:
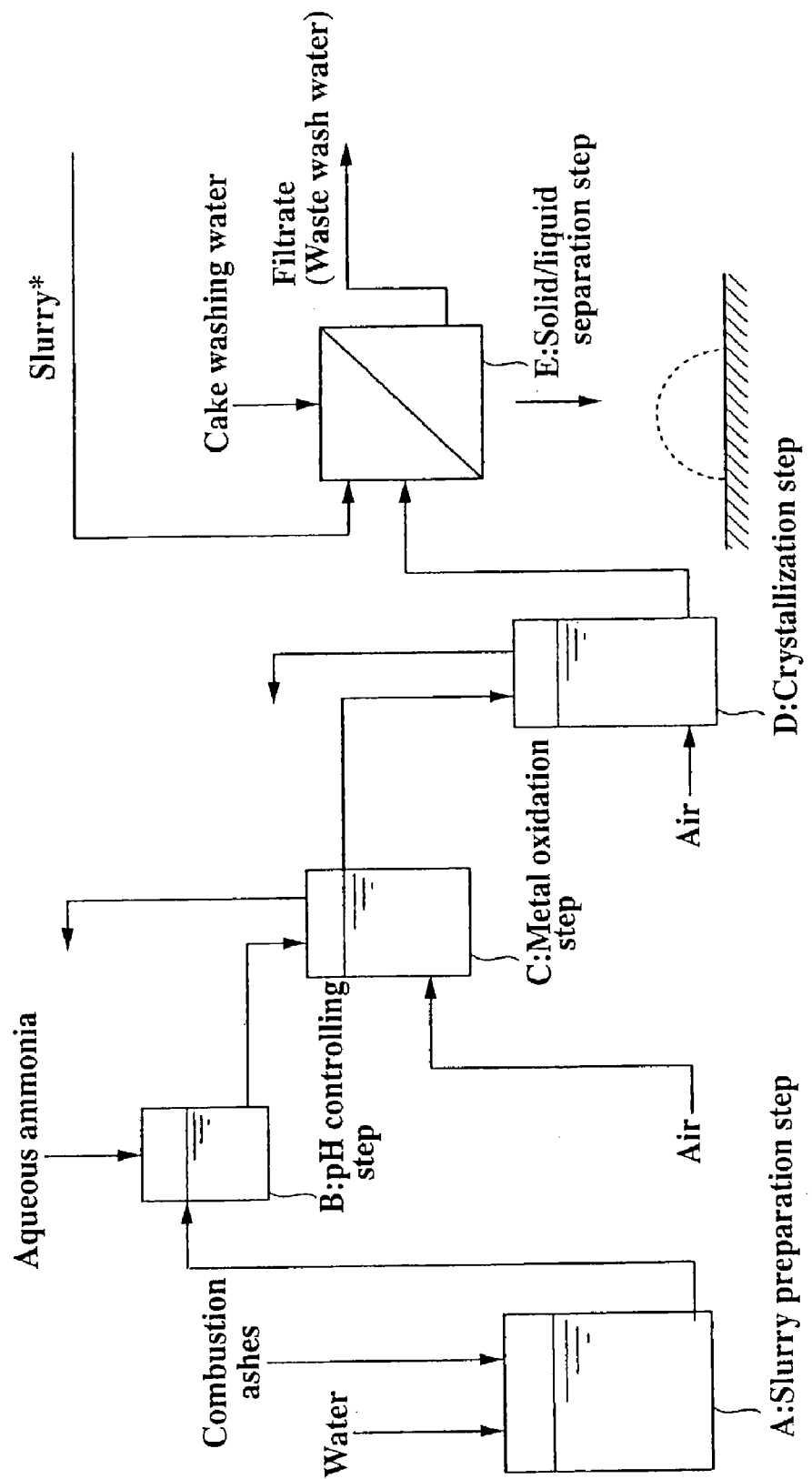
Figure 2:
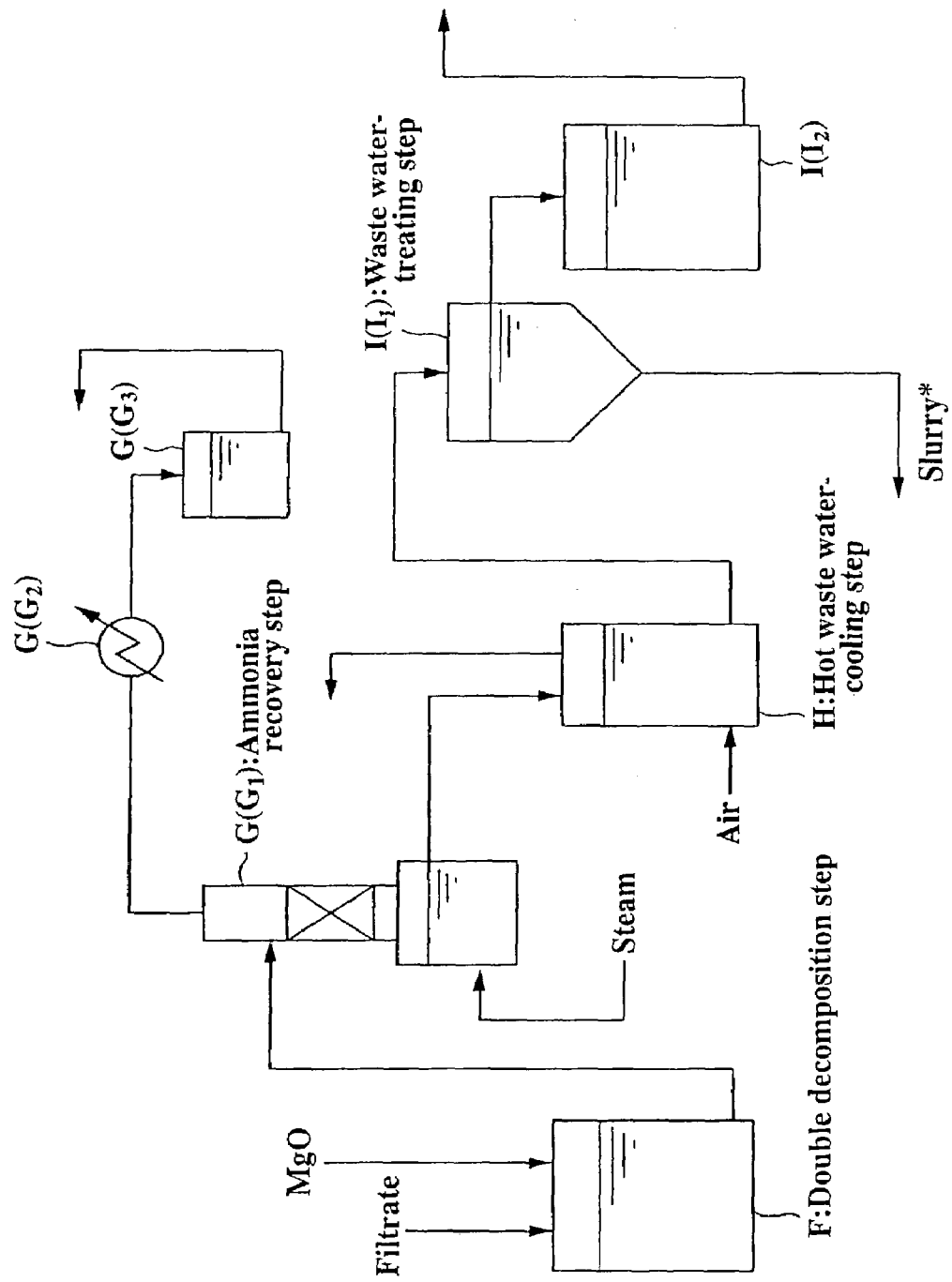

As a result of the present inventors' earnest studies, it has been obtaining a finding and conception that if valuable metal components contained in combustion ashes are concentrated by any suitable method, the valuable metal components can be recovered by known techniques in which the combustion ashes are treated together with unburned carbon as a reducing agent. For example, the results of analysis of a composition (based on dry solids) obtained by removing a large part of ammonium sulfate from the combustion ashes having the composition as shown in Table 1, and then concentrating valuable metal components contained therein together with unburned carbon, are shown in Table 2.

TABLE 2

| Components | C | $NH_4$ | $SO_4$ | V | Ni | Mg |
|---|---|---|---|---|---|---|
| wt. % | 5 to 10 | 0.5 to 1.5 | 2 to 3.5 | 25 to 38 | 2 to 5 | 1 to 2 |

In the above conventional process, if a substantially whole amount of the valuable metal components are recovered in the second step for separating solids (unburned carbon, etc.), this means that the concentration of the valuable metal components contained in the combustion ashes can be achieved only by the second step. Such a process becomes simple, and will be useful in the case where the amount of combustion ashes to be treated is relatively small or where the combustion ashes have a less carbon content and a high vanadium content.

As a result of further studies on the basis of the above conception, it has also been found that the oxidation reaction required for recovering vanadium can be readily conducted and, therefore, can proceed at a relatively low temperature, in the presence of high-concentration ammonium sulfate. Consequently, it becomes possible to separate and recover solids (unburned carbon, etc.) and the valuable metal components from combustion ashes by continuously adopting the relatively low temperature also required for recovering a substantially whole amount of the valuable metal components.

The present invention has been attained on the basis of the above finding and conception. In an aspect of the present invention, there is provided a wet-processing method for combustion ashes of petroleum fuels, which are collected by a dust collector disposed in an exhaust gas passage of a boiler or the like using petroleum fuels and which contain at least vanadium, said method comprising:

a slurry preparation step of preparing a slurry of the combustion ashes, thereby dissolving vanadium contained in the combustion ashes in water;

a metal oxidation step of feeding ammonia and an oxidative gas to the slurry for oxidizing vanadium in the presence of ammonium sulfate, thereby producing a slurry containing ammonium metavanadate;

a solid/liquid separation step of removing solids from the slurry containing ammonium metavanadate;

a double decomposition step for ammonium sulfate, of adding a metal compound capable of forming a water-soluble sulfate to an aqueous ammonium sulfate solution recovered from the solid/liquid separation step; and an ammonia recovery step of recovering ammonia from a reaction solution recovered from the double decomposition step, the metal oxidation step being conducted while controlling an ammonium sulfate concentration of the aqueous solution to 20 to 45% by weight and a temperature of the aqueous solution to not more than 50° C., and the solid/liquid separation step being conducted using a filtration-type solid/liquid separator while controlling a temperature of the slurry to not more than 40° C.

The present invention is described in detail below by referring to the accompanying drawings.

The combustion ashes to be treated by the present invention are such combustion ashes containing at least vanadium, which are collected by a dust collector disposed in an exhaust gas flue of a boiler or the like using petroleum fuels. As described above, such combustion ashes are collected from an electrostatic precipitator of various kinds of combustion furnaces (combustion devices) operated while adding ammonia or magnesium oxide to the exhaust gases. In particular, the method of the present invention can be suitably applied to combustion ashes of "ORIMULSION" having a high vanadium content.

The wet-processing method of the present invention comprises successively a slurry preparation step (A) for preparing a slurry of combustion ashes, a metal oxidation step (C), a solid/liquid separation step (E), a double decomposition step (F) for ammonium sulfate, and an ammonia recovery step (G).

In a preferred embodiment of the present invention, the wet-processing method further comprises a pH-controlling step (B) disposed between the slurry preparation step (A) and the metal oxidation step (C), a crystallization step (D) disposed between the metal oxidation step (C) and the solid/liquid separation step (E), and a hot waste water-treating step (H) and a waste water-treating step (I) successively disposed subsequent to the double decomposition step (F).

In the slurry preparation step (A), the combustion ashes are mixed with water to prepare a slurry of the combustion ashes. The amount of water used in the slurry preparation step (A) may be determined by taking into consideration the concentration of ammonium sulfate (20 to 45% by weight) required in the metal oxidation step (C) described later.

In the pH-controlling step (B), the pH value of the slurry of the combustion ashes is adequately controlled. More specifically, since the subsequent metal oxidation step (C) is performed under neutral or alkali condition, the pH value of the slurry of the combustion ashes is controlled to usually not less than 7, preferably 7 to 9 in the pH controlling step (B). The pH value of the slurry of the combustion ashes may be controlled, for example, by adding thereto aqueous ammonia or ammonium compounds also used as reactants in the present method. Although caustic alkali such as caustic soda may be added only for the purpose of adjusting the pH value, it is preferred to adjust the pH value only by aqueous ammonia or ammonia compounds in order to avoid introduction of additional chemical species into the reaction system.

Meanwhile, the pH value of the slurry of the combustion ashes may also be controlled in an oxidation vessel used in the metal oxidation step (C) prior to initiation of the oxidation reaction.

In the metal oxidation step (C), ammonia and an oxidative gas are fed to the slurry of the combustion ashes in order to oxidize vanadium contained therein in the presence of ammonium sulfate, thereby preparing a slurry containing ammonium metavanadate. As the ammonia, there may be used, for example, ammonia recovered from the ammonia recovery step as described later. Examples of the oxidative gas may include air, oxygen, ozone or the like. Among these oxidative gases, air is preferred in view of practical use.

In the present invention, it is essential to conduct the above metal oxidation step (C) at a temperature of not more than 50° C. while controlling the concentration of ammonium sulfate in aqueous solution to 20 to 45% by weight. Here, the concentration of ammonium sulfate in aqueous solution means such a concentration of ammonium sulfate contained in the aqueous solution obtained by removing solids from the slurry. When the concentration of ammonium sulfate contained in the aqueous solution is less than 20% by weight, the reaction velocity at the reaction temperature of not more than 50° C. becomes low, resulting in too long reaction time. When the concentration of ammonium sulfate is more than 45% by weight, ammonium sulfate is precipitated. When the reaction temperature is more than 50° C., high energy costs are required for cooling the slurry to the temperature (40° C.) required for conducting the subsequent crystallization step (D) and solid/liquid separation step (E). The concentration of ammonium sulfate contained in the aqueous solution is preferably 30 to 40% by weight, and the reaction temperature is preferably 20 to 40° C. The concentration of ammonium sulfate may be controlled by varying the amount of water used upon preparing the slurry of the combustion ashes, or by adding to the slurry the aqueous ammonium sulfate solution recovered from the solid/liquid separation step (E).

In the crystallization step (D), ammonium metavanadate is crystallized by cooling the slurry obtained in the metal oxidation step (C). In the present invention, crystals of ammonium metavanadate are separated together with carbon, etc., in the subsequent solid/liquid separation step (E). Thus, since ammonium metavanadate is previously crystallized in the crystallization step (D), it is possible to enhance a recovery percentage of ammonium metavanadate in the subsequent solid/liquid separation step (E).

As the cooling method used in the crystallization step (D), there may be preferably used a direct cooling method of introducing a cooling air into the slurry containing ammonium metavanadate. In the case of an indirect cooling method using a heat exchanger, scaling tends to be caused on a heat transfer surface thereof. Whereas, in the direct cooling method, such a problem of the scaling can be avoided. The slurry containing ammonium metavanadate is cooled to a temperature of usually not more than 40° C., preferably 20 to 30° C.

The air discharged from the crystallization step (D) is preferably introduced into the slurry of the combustion ashes prepared in the slurry preparation step (A) in order to recover ammonia contained in the air.

In the solid/liquid separation step (E), solids such as crystals of ammonium metavanadate, carbon or the like are removed from the slurry containing crystals of ammonium metavanadate. In the present invention, the solids may be removed using a filtration-type solid/liquid separator.

As the filtration-type solid/liquid separator, there may be usually used a filter press such as a flash plate press and a concave plate press. Alternatively, a centrifugal filter may also be used. Among these filtration-type solid/liquid separators, a filter press is preferred. In the present invention, since the filtration-type solid/liquid separator is used, the removal of the solids can be conducted at a high efficiency and a high volume-reduction percentage unlike the removal using a precipitation concentrator. In addition, the filtration-type solid/liquid separator can also exhibit a higher solid/liquid separation efficiency than that of a centrifugal precipitation-type solid/liquid separator such as decanter.

Further, in the present invention, in the case where the crystallization step (D) is omitted, it is required that the above solid/liquid separation step (E) is conducted while maintaining the slurry at a temperature of not more than 40° C. When the slurry temperature is more than 40° C., the crystallization of ammonium metavanadate becomes insufficient. The slurry temperature is preferably 20 to 30° C. Meanwhile, when other solids such as iron sludge mainly containing iron oxides are by-produced in the metal oxidation step (C), these solids are also removed in the solid/liquid separation step (E).

In addition, in the solid/liquid separation step (E), a cake recovered therefrom is preferably subjected to washing treatment in order to remove ammonium sulfate contained therein. The reasons therefor are as follows. That is, the cake recovered from the solid/liquid separation step (E), which contains ammonium metavanadate crystals, carbon or the like, can be treated together with carbon as a reducing agent by the known process for recovering valuable metal components. In this process, the cake to be treated preferably has a less content of ammonium sulfate as sulfate components ($SO_4$). The ammonium sulfate adhered onto the cake is washed out and recovered as a waste wash water discharged from the washing treatment. Such a waste wash water recovered can be reused as water for the slurry preparation step (A).

The washing treatment may be readily conducted, for example, by feeding a cake wash water into the filter press from a slurry feed portion thereof. The washed cake preferably has an ammonium sulfate content of not more than 5% by weight (based on dry solids).

In the double decomposition step (F) for ammonium sulfate, a metal compound capable of forming a water-soluble sulfate is added to the filtrate (aqueous ammonium sulfate solution) recovered from the solid/liquid separation step (E). Typical examples of the metal compound capable of forming a water-soluble sulfate may include magnesium oxide, magnesium hydroxide or the like. By adding the metal compound, ammonium sulfate is decomposed into ammonia and magnesium sulfate ($MgSO_4$). Since magnesium sulfate is water-soluble unlike calcium sulfate ($CaSO_4$), there arises no problem concerning suspended solids (SS) in waste water.

The magnesium oxide or magnesium hydroxide used in the double composition step is usually present in a stoichiometric or slightly excess amount relative to sulfate radicals. The pH value of the solution obtained after the double composition step is usually 8.5 to 11, more frequently 9 to 10 due to ammonia and unreacted magnesium hydroxide contained in the solution.

In the ammonia recovery step (G), ammonia is recovered from the reaction solution obtained in the double decomposition step. An ammonia separator usable in this step is not particularly restricted thereto, but is usually a counter-current type separator having an excellent stripping efficiency, preferably a counter-current type packed column, more preferably such a counter-current type packed column using steam as a separating medium. Further, as the counter-current type packed column, any known counter-current type packed columns may be used without limitation. The inside of the counter-current type packed column is filled with a large number of packings having a large surface area such as Raschig rings, Lessing rings and saddle-type packings.

In the ammonia recovery step (G) as shown in the drawings, there is adopted the method using steam as a separating medium. The ammonia separator used in this step comprises a counter-current type separator ($G_1$), a condenser ($G_2$) and a storage tank ($G_3$). The ammonia-containing steam recovered from the counter-current type separator ($G_1$) is converted into aqueous ammonia in the condenser ($G_2$), and then introduced into the storage tank ($G_3$).

The recovered aqueous ammonia may be recycled to the metal oxidation step (C), or may be supplied in the form of ammonia gas to the exhaust gas passage where the ammonia gas is used as a neutralizing agent for a sulfate gas ($SO_3$) contained in the exhaust gas.

In the hot waste water-cooling step (H), a cooling air is introduced into a hot waste water discharged from the ammonia recovery step (G). In particular, the hot waste water-cooling step (H) is effective when adopting such a method using steam as a separating medium for the ammonia recovery step (G).

Specifically, the temperature of the hot waste water discharged from the ammonia recovery step (G) is usually near 10° C. Therefore, in the preferred embodiment of the method of the present invention, when the hot waste water is treated in the subsequent waste water-treating step (I) using the precipitation concentrator, the precipitation velocity of solids is lowered because of convection phenomenon of liquid.

Therefore, in the present invention, the hot waster water-cooling step (H) is provided in order to avoid such a convection phenomenon by cooling the liquid. In the hot waste water-cooling step (H), the hot waste water discharged from the ammonia recovery step (G) is cooled to a temperature of 25 to 50° C.

The air discharged from the hot waste water-cooling step (H) contains ammonia therein and, therefore, is preferably introduced into the slurry of the combustion ashes prepared in the slurry preparation step (A) in order to recover ammonia therefrom.

In the waste water-treating step (I), the waste water discharged from the ammonia recovery step (G) is treated using the precipitation concentrator, and the thus recovered slurry was fed to the solid/liquid separation step (E). The waste water-treating step (I) as shown in the drawings comprises a precipitation concentrator ($I_1$) and a storage tank ($I_2$). As the precipitation concentrator ($I_1$), there may be used a thickener, a precipitation tank, a precipitation cone or the like. Among these devices, a thickener is preferred.

The suspended solids (SS) present in the waste water contain magnesium hydroxide or nickel hydroxide as main component. These hydroxides tend to cause clogging in the filtration-type solid/liquid separator or are not readily separated by the centrifugal precipitation-type solid/liquid separator because the hydroxides are fine particles. On the other hand, in the present invention, merely the concentrated slurry is recovered from the precipitation concentrator ($I_1$). Then, the recovered slurry is fed to the solid/liquid separation step (E) where the suspended solids are totally recovered together with other solids such as ammonium metavanadate, carbon, iron sludge or the like.

The waste liquid discharged from the storage tank ($I_2$) of the waste water-treating step contains substantially no suspended solids (SS) but contains only a slight amount of ammonia. Therefore, the waste liquid may be discharged immediately or after being treated with activated sludge.

In the present invention, the solid/liquid separation step (E) having a high volume-reduction percentage is disposed subsequent to the metal oxidation step, and a substantially whole amount of the valuable vanadium components are recovered from such a sole solid/liquid separation step (E). For this reason, energy costs can be considerably saved by lowering not only the temperature of the solid/liquid separation step (E) but also the temperature of the preceding metal oxidation step (C). The low reaction velocity of the metal oxidation step (C) due to the low temperature is compensated by enhancing the concentration of ammonium sulfate. The vanadium components contained in the combustion ashes are concentrated and recovered together with unburned carbon as a reducing agent from the solid/liquid separation step (E). Upon the above recovery, the other metal components constituting suspended solids (SS) are also recovered together at the same time.

BEST MODE FOR CARRYING OUT THE INVENTION

The present invention will be described in more detail by examples, but these examples are not intended to limit the scope of the invention thereto.

EXAMPLE 1

As the combustion ashes of petroleum fuels, there were used combustion ashes having such a composition (based on dry solids) as shown in Table 3 below which were collected by an electrostatic precipitator disposed at an outlet of exhaust gas passage of a boiler using "ORIMULSION" as a fuel, while adding ammonia to the gas passage.

TABLE 3

| Components | C | $NH_4$ | $SO_4$ | V | Ni | Mg |
|---|---|---|---|---|---|---|
| wt. % | 1.0 | 18.0 | 60.0 | 4.5 | 1.0 | 0.3 |

First, in the slurry preparation step (A), the combustion ashes of petroleum fuels and water were mixed together, and then the resultant mixture was heated to 50° C., thereby preparing a slurry of the combustion ashes. It was confirmed that the concentration of ammonium sulfate contained in an aqueous solution obtained by removing solids from the slurry of the combustion ashes was 30% by weight. In the subsequent pH-controlling step (B), the pH value of the slurry was adjusted to 9 by adding thereto aqueous ammonia separated from the below-described ammonia recovery step (G).

Then, in the metal oxidation step (C), while feeding the slurry to a 10 m$^3$ closed-type metal oxidation vessel equipped with stirring blades and heater at a rate of 4 m$^3$/hr and introducing air at a rate of 60 Nm$^3$/hr and heated steam at a pressure of 3 atm and a rate of 0.1 to 0.2 ton/hr into the slurry through a gas feed pipe fitted to the metal oxidation vessel, the oxidation reaction was continuously conducted, thereby obtaining a slurry of the combustion ashes containing ammonium metavanadate. During the oxidation reaction, an inside temperature of the metal oxidation vessel was kept at 50° C.

Then, in the crystallization step (D), a cooling air was blown into the slurry of the combustion ashes containing ammonium metavanadate to cool the slurry temperature to 30° C., thereby precipitating crystals of ammonium metavanadate. Subsequently, in the solid/liquid separation step (E), the slurry was press-treated into a cake using a filter press. Then, a wash water was fed into the filter press through a slurry feed portion thereof to wash the cake. As a result, it was confirmed that the thus recovered cake contained carbon as a main component, and the vanadium concentration of the cake was enhanced to about 17% by weight (based on dry solids). Also, it was confirmed that the dried cake had an ammonium sulfate content of 1% by weight.

Then, in the double decomposition step (F), the aqueous ammonium sulfate solution recovered from the solid/liquid separation step (E) was fed to a reactor, and magnesium oxide was further supplied to the reactor to conduct a double decomposition of ammonium sulfate.

Successively, in the ammonia recovery step (G), the solution obtained from the double decomposition step was fed to a counter-current type packed column to separate and recover ammonia and steam therefrom. More specifically, the solution obtained from the double decomposition step was heated to 80° C., and then fed into the packed column from an upper portion thereof at a rate of 5,000 kg/hr. Concurrently, steam at 160° C. as a separating medium was fed into the packed column from a lower portion thereof at a rate of 1,500 kg/hr. The volume of a packing receiving chamber of the counter-current type packed column was 1.0 m$^3$, and the packings were SUS 304 bell saddles (100 kg).

Then, in the hot waste water-cooling step (H), a cooling air was introduced into the waste water recovered from the ammonia recovery step and heated to about 95° C., thereby cooling the temperature of the waste water to about 40° C.

Then, in the waste water-treating step (I), the waste water recovered from the hot waste water-cooling step (H) was treated using a thickener. It was confirmed that the waste water treated using the thickener contained 150 ppm of ammonia, 10 ppm of vanadium and 10 ppm of nickel. The concentrated slurry was fed to the solid/liquid separation step (E), and treated therein together with the slurry of the combustion ashes containing ammonium metavanadate.

As described above, in accordance with the present invention, there is provided an industrially useful and simple process capable of readily recovering vanadium from combustion ashes which can be suitably used, in particular, in such a case where the amount of combustion ashes to be treated is relatively small or where the combustion ashes have a less carbon content and a high vanadium content.

What is claimed is:

1. A wet-processing method for combustion ashes of petroleum fuels, which are collected by a dust collector disposed in an exhaust gas passage of a boiler using petroleum fuels and contain at least vanadium, comprising:
    a slurry preparation step of preparing a slurry of the combustion ashes, thereby dissolving vanadium contained in the combustion ashes in water;
    a metal oxidation step of feeding ammonia and an oxidative gas to the slurry for oxidizing vanadium in the presence of an aqueous ammonium sulfate solution, thereby preparing a slurry containing ammonium metavanadate;
    a solid/liquid separation step of removing solids from the slurry containing ammonium metavanadate and recovering an aqueous solution of ammonium sulfate;
    a double decomposition step for ammonium sulfate, of adding a metal compound capable of forming a water-soluble sulfate to the aqueous ammonium sulfate solution recovered from the solid/liquid separation step; and
    an ammonia recovery step of recovering ammonia from a reaction solution recovered from the double decomposition step,
    wherein the metal oxidation step is conducted while controlling an ammonium sulfate concentration of the aqueous solution to 20 to 45% by weight and a temperature of the aqueous solution to not more than 50° C., and the solid/liquid separation step is conducted using a filtration solid/liquid separator while controlling a temperature of the slurry to not more than 40° C.

2. A method according to claim 1, wherein the combustion ashes are those obtained by burning emulsion fuels prepared by dispersing natural asphalt produced at a basin of the Orinoco River, Venezuela, South America, in water using a surfactant.

3. A method according to claim 1, which further comprises a crystallization step of precipitating crystals of ammonium metavanadate by introducing cooling air into the slurry obtained in the metal oxidation step, which is disposed between the metal oxidation step and the solid/liquid separation step.

4. A method according to claim 3, wherein ammonia-containing air discharged from the crystallization step is recycled to the slurry preparation step to contact with the slurry of the combustion ashes.

5. A method according to claim 1, wherein a cake recovered from the solid/liquid separation step is subjected to a washing treatment.

6. A method according to claim 5, wherein a waste wash water discharged from the solid/liquid separation step is recycled to the slurry preparation step for reusing the waste wash water as water therefor.

7. A method according to claim 5, wherein the cake recovered from the solid/liquid separation step has an ammonium sulfate content of not more than 5% by weight after drying.

8. A method according to claim 1, which further comprises a hot waste water-cooling step of introducing cooling air into a hot waste water discharged from the ammonia recovery step, which is disposed between the ammonia recovery step and a subsequent precipitation concentrator.

9. A method according to claim 8, wherein ammonia-containing air discharged from the hot waste water-cooling step is introduced into the slurry of the combustion ashes prepared in the slurry preparation step.

10. A method according to claim 1, further comprising a waste water-treating step of treating a waste water recovered from the ammonia recovery step using a precipitation concentrator, and feeding recovered slurry to the solid/liquid separation step.

* * * * *